(12) United States Patent
Lee et al.

(10) Patent No.: US 10,306,501 B2
(45) Date of Patent: May 28, 2019

(54) METHOD FOR REPORTING CHANNEL STATUS IN WIRELESS COMMUNICATION SYSTEM AND APPARATUS THEREFOR

(71) Applicant: LG Electronics Inc., Seoul (KR)

(72) Inventors: Hyunho Lee, Seoul (KR); Suckchel Yang, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/533,600

(22) PCT Filed: Dec. 23, 2015

(86) PCT No.: PCT/KR2015/014183
§ 371 (c)(1),
(2) Date: Jun. 6, 2017

(87) PCT Pub. No.: WO2016/105121
PCT Pub. Date: Jun. 30, 2016

(65) Prior Publication Data
US 2017/0366998 A1    Dec. 21, 2017

Related U.S. Application Data

(60) Provisional application No. 62/096,543, filed on Dec. 24, 2014, provisional application No. 62/098,336, (Continued)

(51) Int. Cl.
*H04W 24/10* (2009.01)
*H04W 8/22* (2009.01)
(Continued)

(52) U.S. Cl.
CPC .......... *H04W 24/10* (2013.01); *H04B 7/0417* (2013.01); *H04B 7/06* (2013.01);
(Continued)

(58) Field of Classification Search
CPC .......... H04W 24/10; H04W 8/22; H04B 7/06; H04B 7/0626; H04L 5/00; H04L 25/0204
(Continued)

(56) References Cited

U.S. PATENT DOCUMENTS

2013/0114554 A1    5/2013 Yang et al.
2013/0258965 A1*  10/2013 Geirhofer ........... H04W 72/048
                                                   370/329
(Continued)

FOREIGN PATENT DOCUMENTS

| CN | 103780358 A | 5/2014 |
|----|----|----|
| EP | 2804425 A1 | 11/2014 |
| KR | 10-2011-0107723 A | 10/2011 |

OTHER PUBLICATIONS

Samsung: "Discussion on CSI reporting for LAA", R1-154154, XP050992566, 3GPP TSG RAN WG1 Meeting #82, Beijing, China, Aug. 24-28, 2015.
(Continued)

*Primary Examiner* — Faisal Choudhury
(74) *Attorney, Agent, or Firm* — Dentons US LLP

(57) ABSTRACT

A method for aperiodically reporting channel status in a wireless communication system, according to one embodiment of the present invention, comprises the steps of: sending, to a base station, terminal performance information containing information about the computing capability of maximum aperiodic channel state information (CSI); receiving an aperiodic CSI reporting request from the base station; and computing an aperiodic CSI corresponding to the aperiodic CSI reporting request on the basis of the computing or reporting capability of the maximum aperiodic CSI, and sending the aperiodic CSI to the base station, wherein information about the computing or reporting capability of the maximum aperiodic CSI can include the number N of
(Continued)

CSI processes which the terminal can compute simultaneously, N being an integer equal to or greater than 1.

18 Claims, 7 Drawing Sheets

Related U.S. Application Data filed on Dec. 31, 2014, provisional application No. 62/160,568, filed on May 12, 2015, provisional application No. 62/246,134, filed on Oct. 26, 2015.

(51) Int. Cl.
  *H04B 7/06* (2006.01)
  *H04L 5/00* (2006.01)
  *H04B 7/0417* (2017.01)
  *H04L 25/02* (2006.01)

(52) U.S. Cl.
  CPC ............ *H04B 7/0626* (2013.01); *H04L 5/00* (2013.01); *H04L 25/0204* (2013.01); *H04W 8/22* (2013.01)

(58) Field of Classification Search
  USPC .......................................................... 370/252
  See application file for complete search history.

(56) References Cited

U.S. PATENT DOCUMENTS

| 2014/0078919 | A1 | 3/2014 | Hammarwall |
| 2014/0086174 | A1* | 3/2014 | Nam ...................... H04L 1/0003 370/329 |
| 2015/0295694 | A1* | 10/2015 | Li ......................... H04L 1/0026 370/329 |

OTHER PUBLICATIONS

Samsung: "Discussion on priority rules for CSI feedback for eCA", R1-152854, XP050971112, 3GPP TSG RAN WG1 Meeting #81, Fukuoka, Japan, May 25-29, 2015.
LG Electronics: "Aperiodic CSI enhancement for Rel-13 CA", R1-156852, XP051003208, 3GPP TSG RAN WG1 Meeting #83, Anaheim, USA, Nov. 16-20, 2015.
R1-144743: 3GPP TSG RAN WG1 #79, San Francisco, CA, Nov. 17-21, 2014, Samsung, "Discussion on CSI measurement aspects for LAA," pp. 1-3.
R1-143707: 3GPP TSG-RAN WG1 Meeting #78bis, Ljubljana, Slovenia, Oct. 6-10, 2014, Huawei, HiSilicon, "Priority rule and UCI handling in dual connectivity," pp. 1-3.
R1-123641: 3GPP TSG-RAN WG1 Meeting #70, Qingdao, China, Aug. 13-18, 2012, Nokia Siemens Networks, Nokia Corporation, "Periodic CSI feedback modes for DL CoMP," pp. 1-3.
R1-124723: 3GPP TSG-RAN WG1 Meeting #71, New Orleans, LA, Nov. 12-16, 2012, Intel Corporation, "Remaining details of periodic CSI reporting," pp. 1-3.

* cited by examiner

METHOD FOR REPORTING CHANNEL STATUS IN WIRELESS COMMUNICATION SYSTEM AND APPARATUS THEREFOR

This application is a 35 USC § 371 National Stage entry of International Application No. PCT/KR2015/014183 filed on Dec. 23, 2015, and claims priority to U.S. Provisional Application Nos. 62/096,543 filed on Dec. 24, 2014; 62/098,336 filed on Dec. 31, 2014; 62/160,568 filed on May 12, 2015 and 62/246,134 filed on Oct. 26, 2015, all of which are hereby incorporated by reference in their entireties as if fully set forth herein.

TECHNICAL FIELD

The present invention relates to a wireless communication system, and more particularly, to a method for reporting channel status in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to suggest a method for reporting channel status in a wireless communication system and an operation related thereto.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

A method for aperiodic channel state report in a wireless communication system according to one embodiment of the present invention comprises transmitting, to a base station, terminal capability information, which includes information on maximum calculation capability of aperiodic channel state information (CSI); receiving an aperiodic CSI report request from the base station; and calculating aperiodic CSI corresponding to the aperiodic CSI report request based on the maximum calculation capability of the aperiodic CSI and transmitting the calculated aperiodic CSI to the base station, wherein the information on the maximum computation capability of the aperiodic CSI includes the number N of maximum CSI processes that the terminal calculates simultaneously, where N is an integer equal to or greater than 1.

Additionally or alternatively, the method may comprise updating aperiodic CSI for the N CSI processes if the aperiodic CSI report request indicates M CSI processes, where M exceeds N.

Additionally or alternatively, the method may comprise calculating and transmitting aperiodic CSI for CSI processes which are in an activated state or in which a valid reference resource exists if the aperiodic CSI report request indicates M CSI processes, where M exceeds N.

Additionally or alternatively, the valid reference resource may include a downlink subframe defined as a CSI reference resource.

Additionally or alternatively, the valid reference resource may include a downlink subframe which belongs to RRP (reserved resource period) for an unlicensed band, a downlink subframe which belongs to RRP and in which a reference signal is transmitted, or a downlink subframe in which a reference signal is transmitted.

Additionally or alternatively, if the number of CSI processes which are in an activated state or in which the valid reference resource exists is greater than N, the method may comprise calculating and transmitting aperiodic CSI for N CSI processes having higher priorities, each CSI process being allocated a priority.

Additionally or alternatively, if a transmission of periodic CSI is required in a subframe in which the aperiodic CSI is transmitted, CSI transmissions for measurement target CSI processes of periodic CSI, which are the same as those of the aperiodic CSI, may be dropped, periodic CSIs selected in accordance with a priority from among CSIs for measurement target CSI processes of periodic CSI, which are not the same as those of the aperiodic CSI, may be transmitted in the subframe by being multiplexed with the aperiodic CSI, and the other periodic CSIs which are not selected may be dropped.

Additionally or alternatively, the priority may include a priority allocated to each of the measurement target CSI processes of the periodic CSI.

Additionally or alternatively, the priority may include a priority allocated to a report mode associated with each of the measurement target CSI processes of the periodic CSI.

Additionally or alternatively, the number of maximum CSI processes may be the number of total CSI processes configured on all cells being configured for the terminal.

A terminal configured to report aperiodic channel status in a wireless communication system according to another embodiment of the present invention comprises a radio frequency (RF) unit; and a processor controls the RF unit, wherein the processor transmits, to a base station, terminal capability information, which includes information on maximum calculation capability of aperiodic channel state information (CSI), receives an aperiodic CSI report request from the base station, and calculates aperiodic CSI corresponding to the aperiodic CSI report request based on the maximum calculation capability of the aperiodic CSI and transmits the calculated aperiodic CSI to the base station, and wherein the information on the maximum computation capability of the aperiodic CSI includes the number N of maximum CSI processes that the terminal calculates simultaneously, where N is an integer equal to or greater than 1.

Additionally or alternatively, the processor may updates aperiodic CSI for the N CSI processes if the aperiodic CSI report request indicates M CSI processes, where M exceeds N.

Additionally or alternatively, the processor may calculates and transmits aperiodic CSI for CSI processes which are in an activated state or in which a valid reference resource exists if the aperiodic CSI report request indicates M CSI processes, where M exceeds N.

Additionally or alternatively, the valid reference resource may include a downlink subframe defined as a CSI reference resource.

Additionally or alternatively, the valid reference resource may include a downlink subframe which belongs to RRP (reserved resource period) for an unlicensed band, a downlink subframe which belongs to RRP and in which a reference signal is transmitted, or a downlink subframe in which a reference signal is transmitted.

Additionally or alternatively, if the number of CSI processes which are in an activated state or in which the valid reference resource exists is greater than N, the processor may calculate and transmit aperiodic CSI for N CSI processes having higher priorities, each CSI being allocated a priority.

Additionally or alternatively, if a transmission of periodic CSI is required in a subframe in which the aperiodic CSI is transmitted, CSI transmissions for measurement target CSI processes of periodic CSI, which are the same as those of the aperiodic CSI, may be dropped, periodic CSIs selected in accordance with a priority from among CSIs for measurement target CSI processes of periodic CSI, which are not the same as those of the aperiodic CSI, may be transmitted in the subframe by being multiplexed with the aperiodic CSI, and the other periodic CSIs which are not selected may be dropped.

Additionally or alternatively, the priority may include a priority allocated to each of the measurement target CSI processes of the periodic CSI.

Additionally or alternatively, the priority may include a priority allocated to a report mode associated with each of the measurement target CSI processes of the periodic CSI.

Additionally or alternatively, the number of maximum CSI processes may be the number of total CSI processes configured on all cells being configured for the terminal.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, channel status may efficiently be reported in a wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
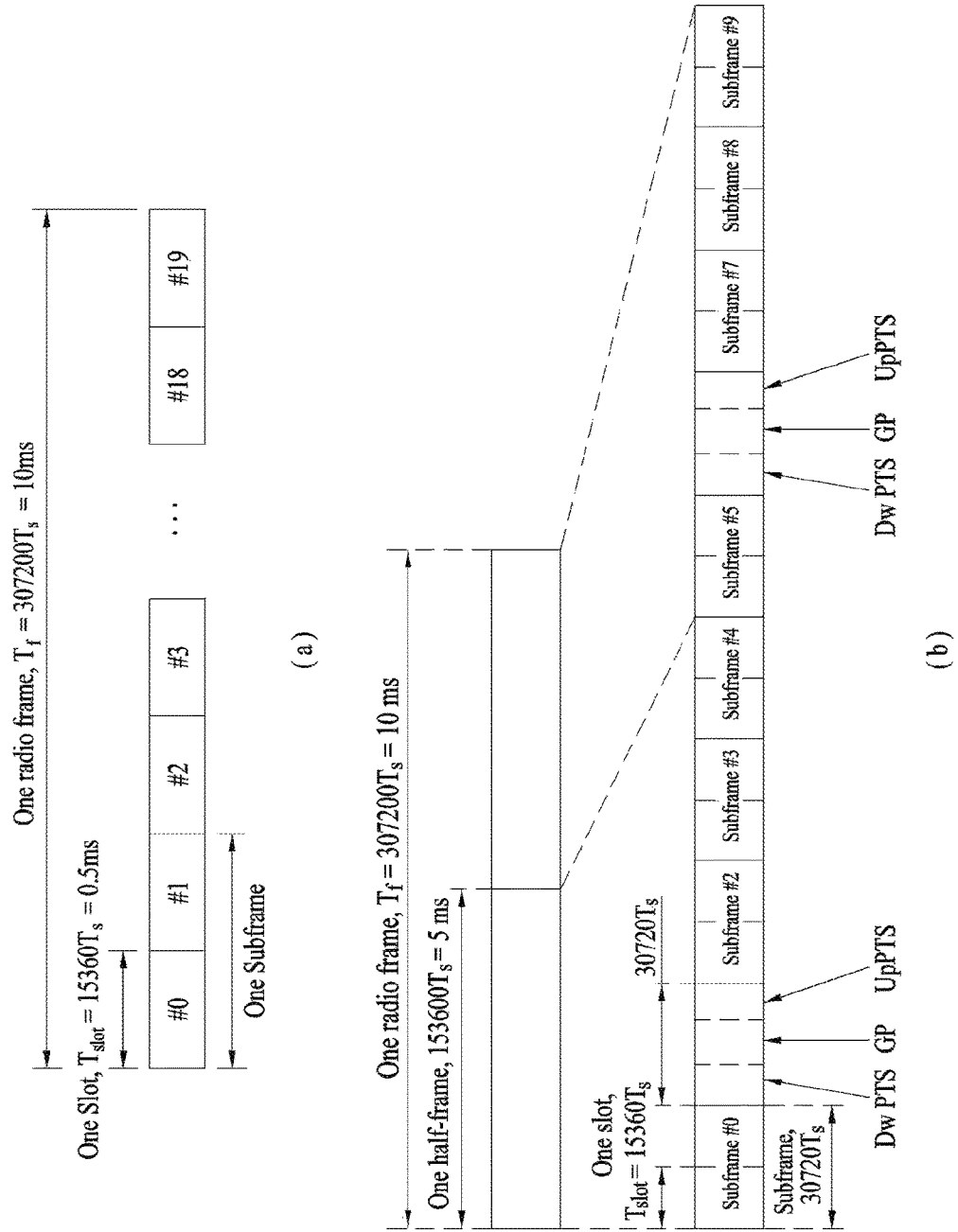
FIG. 1 is diagram illustrating an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming).

DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRA CH RE or PDCCH/PCFICH/PHICH/PDSCH/PUCCH/PUSCH/PR ACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as $T_s=1/(2048*15 \text{ kHz})$. Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
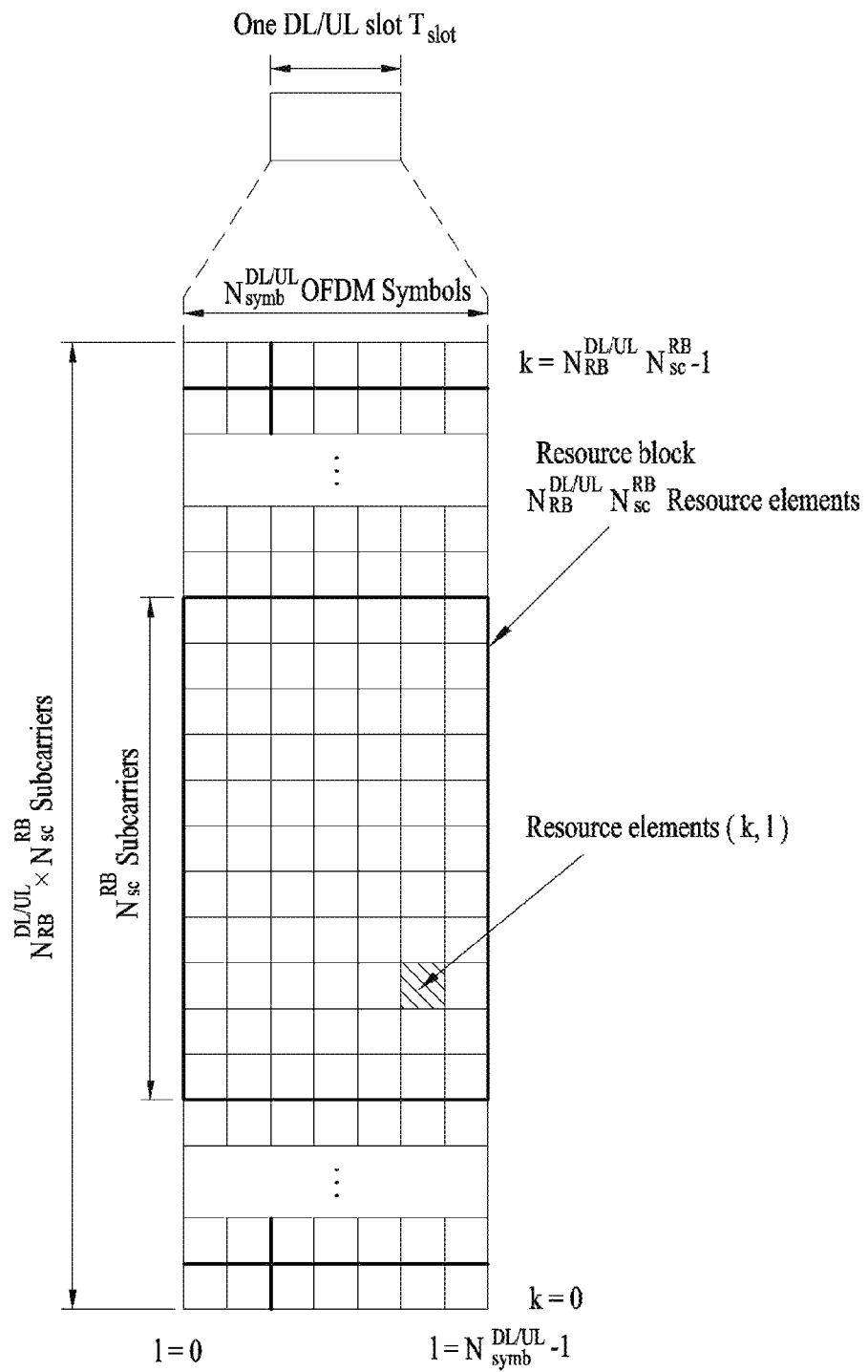
FIG. 2 is diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
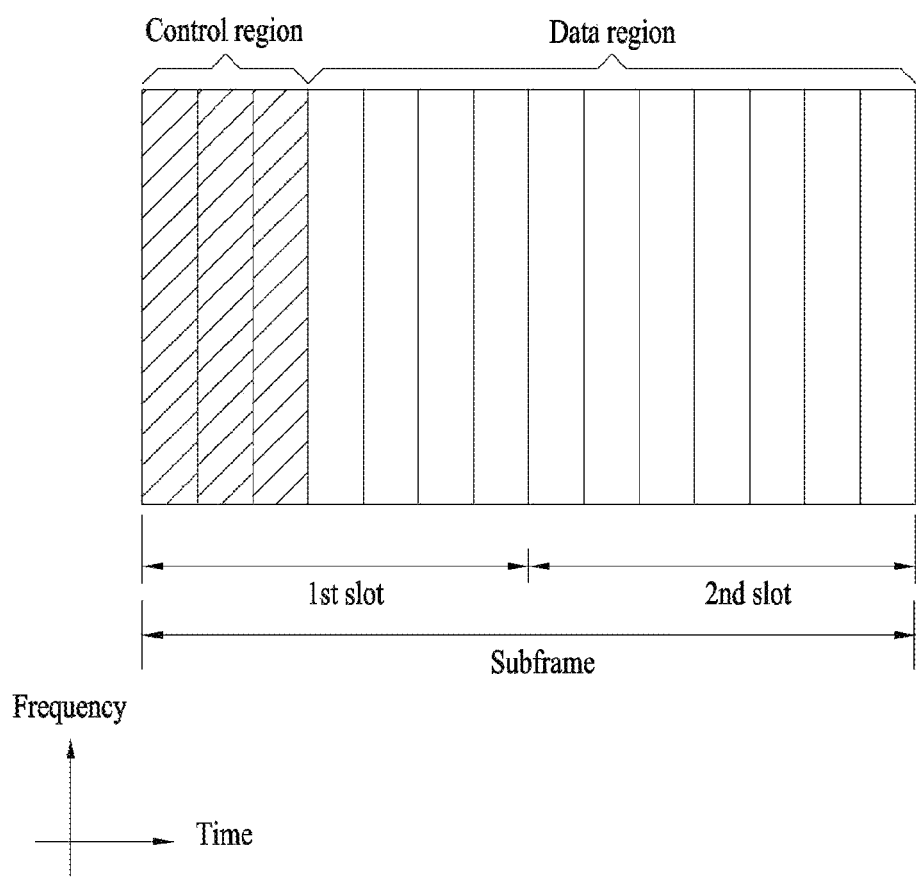
FIG. 3 is diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
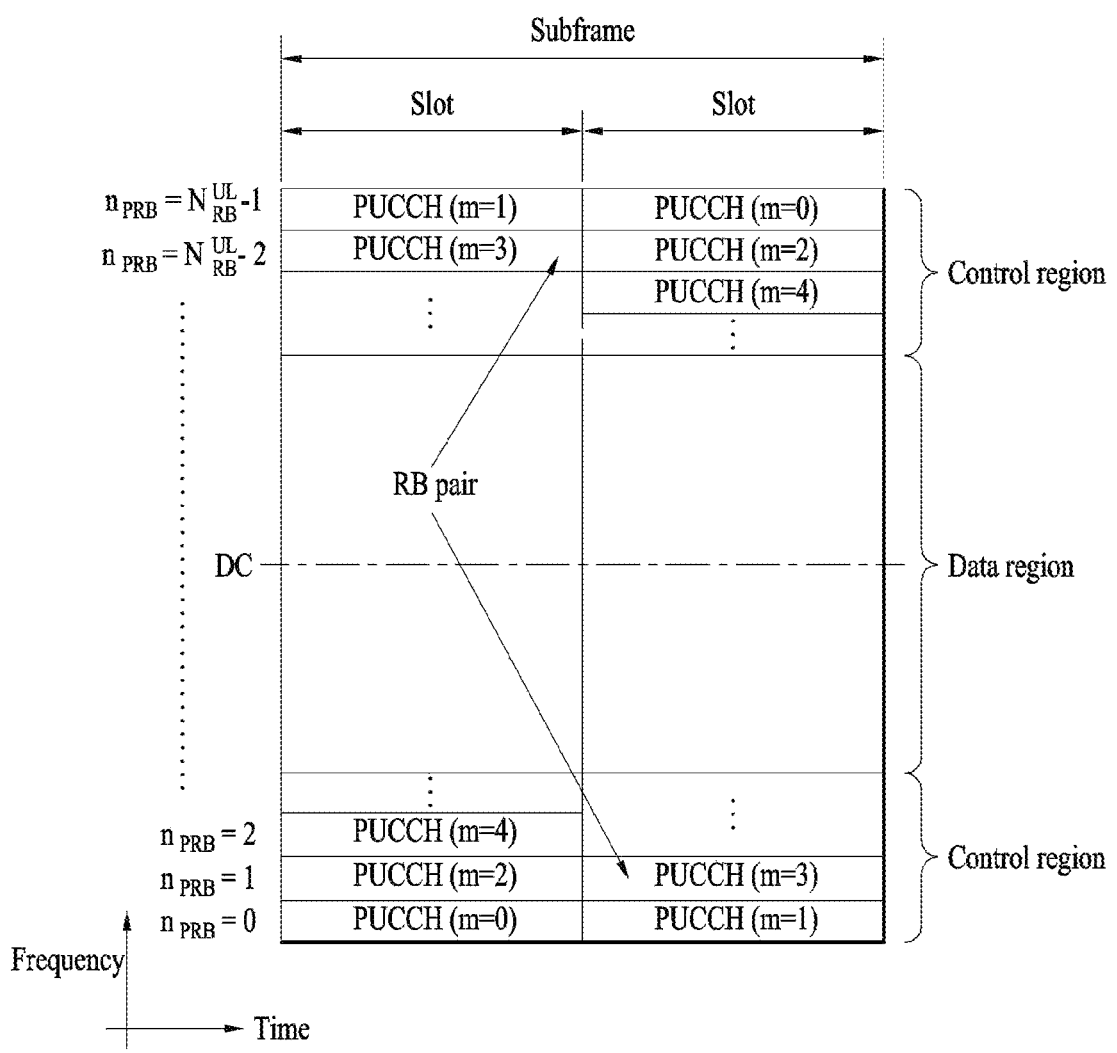
FIG. 4 is diagram illustrating an example of an uplink (UL) subframe structure used in a 3GPP LTE/LTE-A system.
Figure 5:
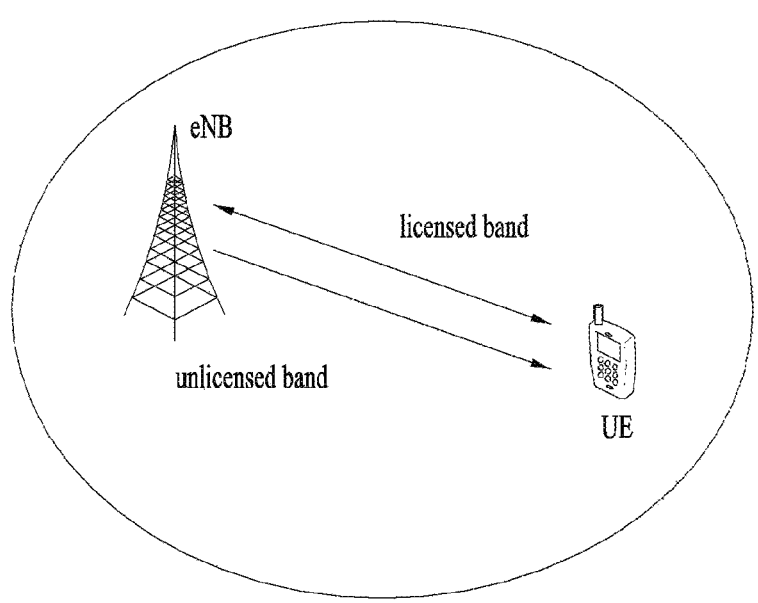
FIG. 5 is a diagram illustrating a carrier aggregation system of component carriers of a licensed band and component carriers of an unlicensed band.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
| --- | --- | --- |
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

TABLE 6

|  |  | PMI Feedback Type | | |
| --- | --- | --- | --- | --- |
|  |  | No PMI | Single PMI | Multiple PMIs |
| PUSCH CQI Feedback Type | Wideband (Wideband CQI) |  |  | Mode 1-2<br>RI<br>1st wideband CQI (4 bit)<br>2nd wideband CQI (4 bit)<br>if RI > 1<br>N * Subband PMI (4 bit)<br>(N is the total # of subbands)<br>(if 8Tx Ant, N * subband W2 + wideband W1) |
|  | UE selected (Subband CQI) | Mode 2-0<br>RI (only for Open-loop SM)<br>1st wideband CQI (4 bit) + Best-M CQI (2 bit)<br>(Best-M CQI: An average CQI for M SBs selected from among N SBs)<br>Best-M index (L bit) |  | Mode 2-2<br>RI<br>1st wideband CQI (4 bit) + Best-M CQI (2 bit)<br>2nd wideband CQI (4 bit) + Best-M CQI (2 bit) if RI > 1<br>Best-M index (L bit)<br>Wideband PMI (4 bit) + Best-M PMI (4 bit)<br>(if 8Tx Ant, wideband W2 + Best-M W2 + wideband W1) |
|  | Higher Layer-configured (Subband CQI) | Mode 3-0<br>RI (only for Open-loop SM)<br>1st wideband CQI (4 bit) + N * subband CQI (2 bit) | Mode 3-1<br>RI<br>1st wideband CQI (4 bit) + N * subbandCQI(2 bit)<br>2nd wideband CQI (4 bit) + N * subbandCQI(2 bit)<br>if RI > 1<br>Wideband PMI (4 bit)<br>(if 8Tx Ant, wideband W2 + wideband W1) | Mode 3-2<br>RI<br>1st wideband CQI (4 bit) + N * subbandCQI(2 bit)<br>2nd wideband CQI (4 bit) + N * subbandCQI(2 bit)<br>if RI > 1<br>N * Subband PMI (4 bit)<br>(N is the total # of subbands)<br>(if 8Tx Ant, N * subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

|  |  | PMI feedback type | |
|---|---|---|---|
|  |  | No PMI | Single PMI |
| PUCCH CQI feedback type | Wideband (wideband CQI) | Mode 1-0 | Mode 1-1 |
|  | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 7, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

Currently, the LTE standard uses the 2-bit CSI request field in DCI format 0 or 4 to operate aperiodic CSI feedback when considering a carrier aggregation (CA) environment. When the UE is configured with several serving cells in the CA environment, the CSI request field is interpreted as two bits. If one of the TMs 1 through 9 is set for all CCs (Component Carriers), aperiodic CSI feedback is triggered according to the values in Table 8 below, and TM 10 for at least one of the CCs If set, aperiodic CSI feedback is triggered according to the values in Table 9 below.

TABLE 8

| A value of CSI request field | Description |
|---|---|
| '00' | No aperiodic CSI report is triggered |
| '01' | Aperiodic CSI report is triggered for a serving cell |
| '10' | Aperiodic CSI report is triggered for a first group of serving cells configured by a higher layer |
| '11' | Aperiodic CSI report is triggered for a second group of serving cells configured by a higher layer |

TABLE 9

| A value of CSI request field | Description |
|---|---|
| '00' | No aperiodic CSI report is triggered |
| '01' | Aperiodic CSI report is triggered for a CSI process group configured by a higher layer for a serving cell |
| '10' | Aperiodic CSI report is triggered for a first group of CSI processes configured by a higher layer |
| '11' | Aperiodic CSI report is triggered for a second group of CSI processes configured by a higher layer |

[LTE in Unlicensed Band (LTE-U)]

As more communication devices require greater communication capacity, a future-generation wireless communication system seeks to efficiently utilize a limited frequency band. In this context, in a cellular communication system such as an LTE system, a method for using an unlicensed band of 2.4 GHz used by the legacy WiFi system or an unlicensed band of 5 GHz newly issued in traffic offloading is under consideration. Since it is basically assumed that wireless transmission and reception is performed in an unlicensed band through contention between communication nodes, each communication node is requested to make sure that another communication node is not transmitting a signal in the unlicensed band, by performing channel sensing before transmitting a signal. This operation is called clear channel assessment (CCA). An eNB or UE of the LTE system should perform CCA to perform signal transmission in the unlicensed band (for convenience, referred to as LTE-U band). Also, when the eNB or the UE of the LTE system transmits a signal, nodes conforming to other communication standards such as Wi-Fi should not interfere with the eNB or the UE by performing CCA. For example, a Wi-Fi standard (801.11ac) regulates that a CCA threshold is −62 dBm for a non-Wi-Fi signal and −82 dBm for a Wi-Fi signal. This means that upon receipt of a non-Wi-Fi signal with power equal to or higher than −62 dBm, a station (STA) or an access point (AP) does not transmit a signal in order not to cause interference. Particularly, in the WiFi system, the STA or the AP may perform CCA if a signal of a CCA threshold or more is not detected for a 4 us or more, and may perform signal transmission.

Hereinafter, for convenience of description, a suggested method will be described based on a 3GPP LTE system. However, a range of a system to which the suggested method is applied may be applied to another system (e.g., UTRA, etc.) in addition to the 3GPP LTE system.

The present specification considers a method for configuring a resource period in a cell/carrier in which an available resource period is acquired or configured aperiodically or discontinuously in the same manner as an unlicensed band where exclusive usage of a specific system is not assured, and a UE operation accompanied with the method. For example, the eNB may transmit a signal to the UE under a carrier aggregation status of an LTE-band which is a licensed band and an unlicensed band. In the following description, for convenience of description of the suggested method, it is assumed that the UE performs wireless communication in each of the licensed band and the unlicensed band through two component carriers. In this case, a carrier of the licensed band may be construed as a primary component carrier (PCC or PCell) while a carrier of the unlicensed band may be construed as a secondary component carrier (SCC or SCell). However, the suggested methods of the present invention may be applied to even the status that a plurality of licensed bands and a plurality of unlicensed bands are used by a carrier aggregation scheme. Also, the suggested methods of the present invention may be applied to even the case that signal transmission and reception between an eNB and a UE is performed in the unlicensed band only. Also, the suggested methods of the present invention may be applied to the other systems as well as the 3GPP LTE system.

According to the current LTE standard, a set including aperiodic CSI measurement target CCs or CSI processes may be configured for the UE through a higher layer signal (e.g., RRC signal). At this time, the number of maximum CCs or CSI processes that may be included in the set is 5. When considering a massive CA environment where 5 or more CCs are aggregated to transmit downlink data, the UE may need to notify the eNB of its CSI computation and report capability. Therefore, the present specification suggests the following.

The UE may notify the eNB of its maximum simultaneous aperiodic CSI computation/report capability in a unit of CCs or CSI processes (e.g., N CCs or CSI processes). That is, the corresponding UE may simultaneously perform aperiodic CSI computation/report operation for maximum N CCs or CSI processes. Meanwhile, CCs or CSI processes (e.g., M CCs or CSI processes) greater than N may be configured for the UE as one set, and the UE may receive a request of aperiodic CSI report for the corresponding set from the eNB. Alternatively, the UE may be requested aperiodic CSI report for a plurality of sets at the same time, and a sum of CCs or CSI processes configured in the corresponding plurality of sets may be designated to M (greater than N).

Meanwhile, the N may be the number of all CSI processes that may be configured on all cells that may be configured for the UE.

When a set including aperiodic CSI measurement target CCs or CSI processes is configured for the UE, and a total number of CCs or CSI processes configured in a single set or a plurality of sets requested at the same time is M, the followings will be suggested.

If the number of CCs or CSI processes of a triggering set configured for the UE for aperiodic CSI is greater than maximum simultaneous computation/report capability of the UE (e.g., M>N), the UE transmits aperiodic CSI with respect to only CCs or CSI processes which are in an activated state and/or in which a valid reference resource exists.

In this case, the activated state may be defined as follows. In case of a cell (e.g., Ucell) deployed in the unlicensed band, (1) the Ucell may be regarded as being always activated if the Ucell is configured (or added) by a higher layer signal (e.g., RRC signal), or (2) the Ucell may be regarded as being activated if the Ucell is configured (or added) by a higher layer signal (e.g., RRC signal) and at RRP only of the corresponding Ucell, and may be regarded as being deactivated at the other period.

In this case, in case of a cell (e.g., Lcell) deployed in the licensed band, the "valid reference resource" means a downlink subframe defined as a CSI reference resource by satisfying a validity condition of the LTE standard (TS36.213). In case of a cell (e.g., Ucell) deployed in the unlicensed band, the "valid reference resource" may be defined as (1) a downlink subframe which belongs to RRP, (2) a downlink subframe on which a predefined RS (e.g., CRS, CSI-RS, etc.) is actually transmitted even within RRP, or (3) a downlink subframe on which a predefined RS (e.g., CRS, CSI-RS, etc.) is transmitted regardless of RRP.

In the above-described suggestion, if the number (e.g., L) of CCs or CSI processes which are in an activated state and/or in which the valid reference resource exists is greater than N (e.g., M≥L≥N), the UE may select N CCs or CSI processes of high priority on the basis of a predefined priority in accordance with index of CCs or CSI processes and then transmit aperiodic CSI. For example, if a high priority is given to low index (that is, if low CSI process index or (if the CSI process index is the same) low CC index is configured to have a high priority), L=7, N=5, and if (CC1, CSI process 1), (CC1, CSI process 2), (CC1, CSI process 3), (CC1, CSI process 4), (CC2, CSI process 1), (CC2, CSI process 2), and (CC2, CSI process 3) are in an activated state and/or the valid reference resource exists, aperiodic CSI may be transmitted with respect to only (CC1, CSI process 1), (CC2, CSI process 1), (CC1, CSI process 2), (CC2, CSI process 2), (CC1, CSI process 3) corresponding to N=5 having a high priority.

Alternatively, the UE may select N CCs or CSI processes of high priority configuration between CCs or CSI processes and then transmit aperiodic CSI. Priority configuration between CCs or CSI processes may be defined previously or indicated through a high layer signal. For example, in the cell (e.g., Lcell) deployed in the licensed band and the cell (e.g., Ucell) deployed in the unlicensed band, a high priority may be given to the cell deployed in the licensed band. For example, when CC1, CC3 and CC5 correspond to the Lcell, and CC2, CC4 and CC6 correspond to the Ucell, L=4, N=2, and if (CC1), (CC2), (CC3), and (CC4) are in an activated state and/or the valid reference resource exists, the UE may transmit aperiodic CSI with respect to only (CC1), (CC3) corresponding to N=2 having a high priority.

By contrast, in the cell (e.g., Lcell) deployed in the licensed band and the cell (e.g., Ucell) deployed in the unlicensed band, a high priority may be given to the cell deployed in the unlicensed band. Unlike the existing Lcell where available resources (e.g., subframe, PRB) are assured consecutively, since resources are configured occasionally/aperiodically through an operation such as carrier sensing in case of the Ucell, it is advantageous that such priority configuration may more actively provide CSI measurement/report occasion for the Ucell configured occasionally.

To support aperiodic CSI feedback of more CCs or CSI processes, it may be preferable that the number of feedback content bits is reduced. To this end, when the UE reports CQI for a plurality of CCs or CSI processes to one PUSCH feedback, the UE may report CQI value (i.e., referred to as CQI-ref) of CC or CSI process of a specific index and report CQI values of the other CCs or CSI processes in the form of a differential CQI value indicating a relative difference with the CSI-ref value. In this case, a value indicating a difference of a relative CQI level for a specific CQI index may be referred to as a differential CQI value, and a table for this value may be indicated by a higher layer signal (e.g., RRC signal) or may be defined previously.

At this time, measurement target CC or CSI process of CQI-ref which is a reference for differential CQI value computation may be defined previously or indicated by a higher layer signal. For example, CC or CSI process which is a reference may be a CC for transmitting PUSCH or a specific CSI process of the CC.

CCs or CSI processes that may be used as the differential CQI value may be defined previously or indicated by a higher layer signal. The UE reports CCs or CSI processes indicated to be used as the differential CQI value in the form of a differential CQI value indicating a relative difference for a CQI-ref value, and reports the other CCs or CSI processes in the form of a CQI value calculated by the existing method.

The differential CQI value may be reported through the following rules.

$\hat{1}$ To report wideband CQI for a first codeword of CCs or CSI processes that may be used as a differential CQI value, the UE may obtain a differential CQI value by using a wideband CQI value for the first codeword of a measurement target CC or CSI process, which is a reference, as CQI-ref.

$\hat{2}$ To report wideband CQI for a second codeword of CCs or CSI processes that may be used as a differential CQI value, the UE may obtain (1) differential CQI for a wideband CQI value of the first codeword or (2) obtain a differential CQI value by using a wideband CQI value for the first codeword of a measurement target CC or CSI process of CQI-ref, which is a reference, as CQI-ref. A calculation method may be defined previously or indicated by a higher layer signal.

$\hat{3}$ To report UE selected subband CQI for a first codeword of CCs or CSI processes that may be used as a differential CQI value, the UE may obtain (1) a differential CQI value by using a wideband CQI value for the first codeword of a measurement target CC or CSI process of CQI-ref which is a reference, as CQI-ref, or (2) obtain differential CQI for a wideband CQI value of the first codeword. A calculation method may be defined previously or indicated by a higher layer signal.

$\hat{4}$ To report UE selected subband CQI for a second codeword of CCs or CSI processes that may be used as a differential CQI value, the UE may obtain (1) a differential CQI value by using a wideband CQI value for the first codeword of a measurement target CC or CSI process of CQI-ref which is a reference, as CQI-ref, or (2) obtain differential CQI for a wideband CQI value of the second codeword. A calculation method may be defined previously or indicated by a higher layer signal.

$\hat{5}$ To report high-layer configured subband CQI for a first codeword of CCs or CSI processes that may be used as a differential CQI value, the UE may obtain (1) a differential CQI value by using a wideband CQI value for the first codeword of a measurement target CC or CSI process of CQI-ref which is a reference, as CQI-ref, or (2) obtain differential CQI for a wideband CQI value of the first codeword. A calculation method may be defined previously or indicated by a higher layer signal.

$\hat{6}$ To report high-layer configured subband CQI for a second codeword of CCs or CSI processes that may be used as a differential CQI value, the UE may obtain (1) a differential CQI value by using a wideband CQI value for the first codeword of a measurement target CC or CSI process of CQI-ref which is a reference, as CQI-ref, or (2) obtain differential CQI for a wideband CQI value of the second codeword. A calculation method may be defined previously or indicated by a higher layer signal.

As a method for reducing the number of feedback content bits, if the eNB requests aperiodic CSI for a certain number of CCs or CSI processes, reporting mode thereof may be limited. In more detail, if the eNB requests aperiodic CSI for a certain number of CCs or CSI processes, only a reporting mode such as reporting mode 1-x or reporting mode 2-y is configured to report wideband CQI or wideband CQI+UE selected subband CQI.

The UE may change a reporting mode of aperiodic CSI feedback (for example, may configure more compact/lighter reporting mode) through the amount of resources (e.g., the number of RBs or the number of available REs) allocated for PUSCH scheduling for aperiodic CSI.

The UE may change a reporting mode of aperiodic CSI feedback (for example, may configure more compact/lighter reporting mode) through UL grant DCI including aperiodic CSI triggering.

The UE may change a reporting mode of aperiodic CSI feedback in accordance with combination of the number of CSI measurement target CSI processes/CCs of triggered aperiodic CSI and the amount of resources (e.g., the number of RBs allocated for PUSCH or the number of available REs) allocated for PUSCH.

The UE may change a reporting mode of aperiodic CSI feedback in accordance with combination of the amount of feedback corresponding to aperiodic CSI and the amount of resources (e.g., the number of RBs allocated for PUSCH or the number of available REs) allocated for PUSCH.

In the above methods, the amount of CSI feedback may be considered as the number of CSI processes or the number of CSI bits, and the amount of PUSCH resources may be considered as the number of RBs or the number of available REs.

Multiplexing of Periodic and Aperiodic CSI Feedback

When PUSCH is scheduled at a subframe on which periodic CSI feedback is transmitted, periodic CSI is transmitted through PUSCH by being multiplexed with UL data of PUSCH in accordance with a scheduled rate-matching/puncturing rule. This will be referred to as piggyback.

When aperiodic CSI feedback transmission is triggered at a subframe on which periodic CSI feedback is transmitted, according to the current LTE standard, periodic CSI feedback is dropped and aperiodic CSI feedback transmission is performed. In the legacy LTE rel-8 system, since measurement targets of periodic CSI feedback and aperiodic CSI feedback are the same DL CC, it is not required that both periodic CSI and aperiodic CSI should be transmitted, and since a reporting mode of aperiodic CSI may provide more detailed channel state information than that of periodic CSI, periodic CSI feedback is dropped and aperiodic CSI feedback is transmitted.

By contrast, according to the current LTE standard, periodic CSI feedback may be configured for a plurality of CCs and/or a plurality of CSI processes, and a plurality of CCs or CSI processes previously configured through RRC signaling may be triggered for aperiodic CSI feedback measurement through UL grant DCI. Therefore, transmission of periodic CSI feedback for one or more CCs or CSI processes and transmission of aperiodic CSI feedback for one or more CCs or CSI processes may simultaneously be required at the same subframe. As the number of cells for CA is increased, the number of CCs or CSI processes for corresponding periodic CSI feedback is increased. If CCs or CSI processes for periodic CSI feedback are not the same as those for aperiodic CSI feedback, DL throughput may be degraded due to excessive periodic CSI drop. Therefore, simultaneous transmission of periodic CSI feedback and aperiodic CSI feedback at the same subframe may be considered in the next generation system to solve or reduce the above problem. Hereinafter, the present invention suggests a method for determining whether to simultaneously transmit or drop periodic CSI feedback and aperiodic CSI feedback within the same subframe and configuring/transmitting CSI feedback information in case of simultaneous transmission.

Aperiodic CSI feedback measurement target CCs/CSI processes are compared with periodic CSI feedback measurement target CCs/CSI processes, whereby all of periodic CSI feedbacks for the same measurement target CCs/CSI processes may be dropped. For example, if the periodic CSI feedback measurement targets are CSI processes 1 and 3 and aperiodic CSI feedback measurement targets are CSI processes 2 and 3, periodic CSI feedback for the CSI process 3 may be dropped.

Aperiodic CSI feedback measurement target CCs/CSI processes are compared with periodic CSI feedback measurement target CCs/CSI processes, whereby simultaneous transmission of aperiodic CSI and periodic CSI is performed for measurement target CCs/CSI processes which are not the same as each other, as follows in accordance with a pre-defined rule or higher layer signal configuration, or specific CSI is dropped.

First alternative: If only one periodic CSI feedback measurement target CC/CSI process which is not the same as aperiodic CSI feedback measurement target CC/CSI process exists, the UE may transmit periodic CSI feedback through piggyback to PUSCH. If PUCCH/PUSCH simultaneous transmission mode is configured, the UE may transmit periodic CSI feedback through PUCCH and aperiodic CSI feedback through PUSCH, simultaneously at the same subframe. Alternatively, the UE may transmit periodic CSI feedback for CC/CSI process which is not the same as aperiodic CSI feedback measurement target CC/CSI process through piggyback to PUSCH even though the PUCCH/PUSCH simultaneous transmission mode is configured.

Second alternative: If a plurality of periodic CSI feedback measurement target CCs/CSI processes which are not the same as aperiodic CSI feedback measurement target CC/CSI process exist, the UE may transmit periodic CSI feedbacks for one or a plurality of measurement target CCs/CSI processes having higher priority through piggyback to PUSCH in accordance with a priority of measurement target CCs/CSI processes, and may drop periodic CSI feedbacks for the other measurement target CCs/CSI processes. If PUCCH/PUSCH simultaneous transmission mode is configured, the UE may transmit periodic CSI feedbacks for one or more measurement target CCs/CSI processes having higher priority through PUCCH and aperiodic CSI feedback through PUSCH, simultaneously at the same subframe. Alternatively, the UE may transmit periodic CSI feedbacks for one or more CCs/CSI processes having higher priority through piggyback to PUSCH even though the PUCCH/PUSCH simultaneous transmission mode is configured.

At this time, the priority may be a priority of predefined measurement target CCs/CSI processes. Alternatively, the UE may transmit only periodic CSI feedbacks for one or more measurement target CCs/CSI processes of higher priority in the order of CSI process index >CC index.

Also, at this time, the number of periodic CSIs transmitted through piggyback to PUSCH or transmitted at the same subframe as that of aperiodic CSI through PUCCH may be defined previously or configured through a higher layer signal.

For example, considering that a priority is determined to be high if CSI process index is low and the number of periodic CSIs transmitted at the same subframe as that of aperiodic CSI is set to 2, if periodic CSI feedback measurement targets are CSI processes 1, 2 and 4 and aperiodic CSI feedback measurement target is CSI process 3, the UE may transmit periodic CSI feedbacks for the CSI processes 1 and 2 through piggyback to PUSCH. The UE may drop periodic CSI feedback for the CSI process 4. If PUCCH/PUSCH simultaneous transmission mode is configured, the UE may transmit periodic CSI feedbacks for the CSI processes 1 and 2 through PUCCH and aperiodic CSI feedback through PUSCH, simultaneously at the same subframe. Alternatively, the UE may transmit periodic CSI feedbacks for the CSI processes 1 and 2 through piggyback to PUSCH even though the PUCCH/PUSCH simultaneous transmission mode is configured.

Third alternative: If a plurality of periodic CSI feedback measurement target CCs/CSI processes which are not the same as aperiodic CSI feedback measurement target CC/CSI process exist, the UE may transmit periodic CSI feedbacks for one or a plurality of measurement target CCs/CSI processes having higher priority through piggyback to PUSCH in accordance with a priority of reporting mode of periodic CSI feedback, and may drop periodic CSI feedbacks for the other measurement target CCs/CSI processes. If PUCCH/PUSCH simultaneous transmission mode is configured, the UE may transmit periodic CSI feedbacks for one or more measurement target CCs/CSI processes having higher priority through PUCCH and aperiodic CSI feedbacks through PUSCH, simultaneously at one subframe. Alternatively, the UE transmits periodic CSI feedbacks for one or more CCs/CSI processes having higher priority of the reporting mode through piggyback to PUSCH even though the PUCCH/PUSCH simultaneous transmission mode is configured.

For example, the priority may be configured in the order of feedback modes 2-1>1-1>2-0>1-0. It is assumed that periodic CSI feedback measurement targets are CSI processes 1, 2, and 3, a reporting mode of the CSI process 1 is set to 1-0, a reporting mode of the CSI process 2 is set to 2-1 and a reporting mode of the CSI process 3 is set to 1-1. In this case, if the number of periodic CSIs transmitted at the same subframe as that of aperiodic CSI is set to 2, the UE may simultaneously transmit periodic CSIs for the CSI processes 2 and 3 at the same subframe as that of aperiodic CSI, and may drop periodic CSI for the CSI process 1.

Limiting UE Processing Complexity

According to the current LTE standard, the UE may determine the number Nu of unreported CSI processes (i.e., which are not fed back) corresponding to another (previous) CSI request with respect to one cell, at a subframe timing when CSI request for aperiodic CSI is received, and may update max (Nx-Nu, 0) lowest-indexed CSI processes. In this case, Nx is defined as the number of maximum CSI processes that may be supported by the UE when the corresponding cell is FDD or TDD serving cell and 4 CSI processes are configured. If the corresponding cell is TDD serving cell and 2 or 3 CSI processes are configured, Nx is defined as 3.

Although the above rule is defined to limit UE processing complexity of aperiodic CSI reporting, the UE which supports CA for more cells/CCs may need to trigger aperiodic CSI for more DL CCs.

The UE may perform aperiodic CSI calculation/report operation for maximum N CCs or CSI processes at the same time. When a set including aperiodic CSI measurement target CCs or CSI processes is configured for the UE, and the number of total CCs or CSI processes configured in a single set or a plurality of sets requested at the same time is M, the followings will be suggested.

The UE may report its maximum simultaneous aperiodic CSI calculation/report capability to the eNB in a unit of CC or CSI process (e.g., N CCs or CSI processes). If the number of total CCs or CSI processes of a triggering set configured for the UE for aperiodic CSI is greater than maximum simultaneous calculation/report capability of the UE (e.g., M>N), the UE may report M CCs/CSI processes of the corresponding triggering set and update maximum N CCs/CSI processes.

To equally update more CSI processes when performing aperiodic CSI report, the UE may differently configure cell/CSI process indexes updated based on the predefined rule. In more detail, the UE may select N (e.g., N=max(Nx-Nu, 0)) CSI processes through circular shift selection and update them from index after CSI process having the updated highest index among CSI processes corresponding to another (previous) CSI request, with respect to one cell at a subframe timing on which CSI request for aperiodic CSI is received. In this case, the corresponding N (e.g., N=max (Nx-Nu, 0)) CSI processes may be limited to only CSI processes which are not updated at a previous update available timing.

As another method, the UE may update N (e.g., N=max (Nx-Nu, 0)) CSI processes, which are most previously updated among M triggered CCs/CSI processes, with respect to one cell at a subframe timing when CSI request for aperiodic CSI is received.

The UE may perform aperiodic CSI calculation/report operation for maximum N CCs or CSI processes at the same time. When a set including aperiodic CSI measurement target CCs or CSI processes is configured for the UE, and the number of total CCs or CSI processes configured in a single set or a plurality of sets requested at the same time is M, the UE may report its maximum simultaneous aperiodic CSI calculation/report capability to the eNB in a unit of CC or CSI process (e.g., N CCs or CSI processes).

If the UE may configure the number of cells constituting CA or the number of total CSI processes configured for the UE within a specific value (specific range) or to exceed the specific value, and/or the number of total CCs or CSI processes of a triggering set configured for aperiodic CSI is greater than maximum simultaneous calculation/report capability of the UE (e.g., M>N), a rule may be defined such that the UE may update N CSI processes having a priority after CSI process having the updated lowest priority among CSI processes corresponding to another (previous) CSI request at a subframe timing when CSI request for aperiodic CSI is received.

In this case, the priority may be determined in such a manner that parameters of "([option #A] CG index), CSI report mode, ([option #B] CG index) CSI process index (/ID), 9[option #C] CG index), cell index, CSI SF set index" are considered/compared in the listed order. As a detailed example, CSI process related to relatively low (or high) CG index and/or cell index and/or CSI SF set index and/or CSI process index (or ID) may be configured to have a high priority. In addition to a reference of the priority listed above or alternatively, CSI process related to LCell (or UCell) may be configured to have a priority higher than CSI process related to UCell (or LCell), and/or CSI process related to PUCCH TX cell may be configured to have a priority higher than CSI process related to NON-PUCCH TX cell, and/or unreported CSI process may be configured to have a priority higher than CSI process triggered by the latest aperiodic CSI request message, and/or CSI process having smaller payload of CSI report mode may be configured to have a higher priority.

Figure 6:
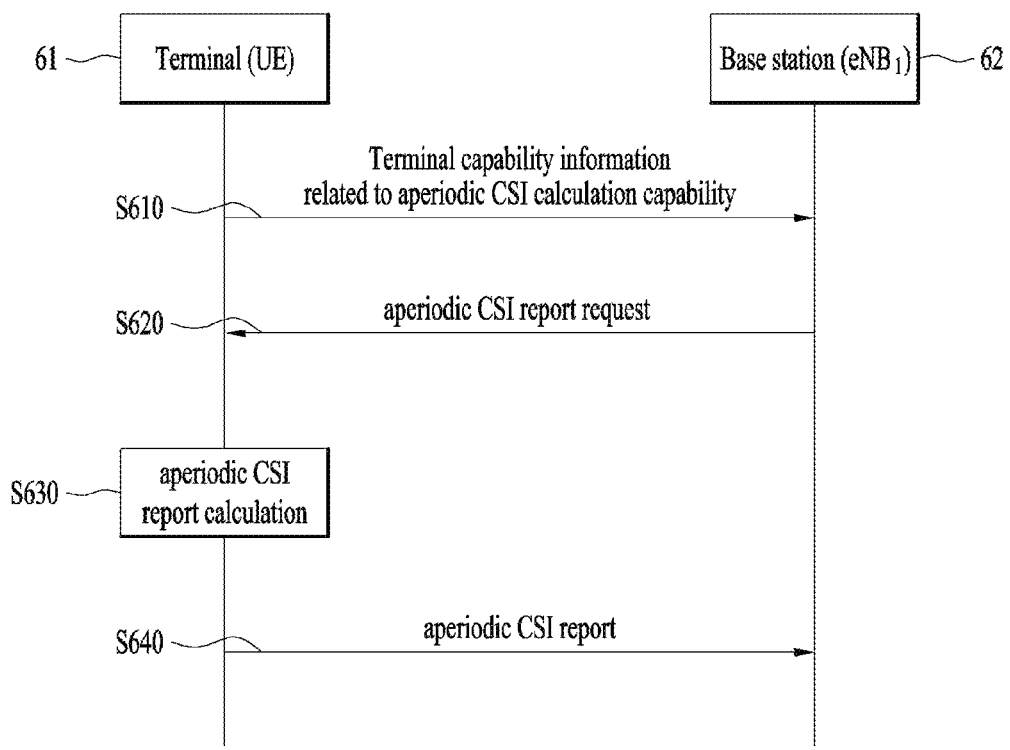
FIG. 6 is a diagram illustrating an operation according to one embodiment of the present invention.

FIG. 6 is a diagram illustrating an operation according to one embodiment of the present invention.

FIG. 6 relates to a method for receiving a reference signal for positioning in a wireless communication system.

The terminal 61 may transmit terminal capability information, which includes information on maximum calculation capability of aperiodic channel state information (CSI), to the base station 62 (S610). Then, the terminal may receive an aperiodic CSI report request from the base station (S620). The aperiodic CSI report request may be based on the terminal capability information.

The terminal may calculate aperiodic CSI corresponding to the aperiodic CSI report request based on the maximum aperiodic CSI calculation or report capability (S630) and transmit the aperiodic CSI to the base station (640).

The information on the maximum aperiodic CSI calculation or report capability may include the number N (N is an integer greater than 1) of CSI processes that may be calculated simultaneously by the terminal. The number N of CSI processes that may be calculated simultaneously relate to all cells or component carriers configured for the terminal.

Also, if the aperiodic CSI report request indicates M CSI processes, where M exceeds N, the terminal may update aperiodic CSI for the N CSI processes.

Also, if the aperiodic CSI report request indicates the number of CSI processes, where M exceeds N, the terminal may calculate aperiodic CSI for CSI processes which are in an activated state or in which a valid reference resource exists, and then may transmit the calculated result. The valid reference resource may include a downlink subframe defined as a CSI reference resource. Also, the valid reference resource may include a downlink subframe which belongs to reserved resource period (RRP) for an unlicensed band, a downlink subframe which belongs to RRP and on which a reference signal is transmitted, or a downlink subframe in which a reference signal is transmitted.

Also, if the number of CSI processes which are in an activated state or in which the valid reference resource exists is greater than N, the terminal may calculate aperiodic CSI for N CSI processes of higher priorities and transmit the calculated result.

Also, if a transmission of periodic CSI is required at a subframe in which the aperiodic CSI is transmitted, CSI transmissions of measurement target CSI processes of periodic CSI, which are the same as that of aperiodic CSI, may be dropped, a part of periodic CSIs selected in accordance with a priority from among CSIs for measurement target CSI processes of periodic CSI which is not the same as that of the aperiodic CSI may be transmitted in the subframe by being multiplexed with the aperiodic CSI, and the other periodic CSIs which are not selected may be dropped. The priority may include a priority allocated to each of the measurement target CSI processes of the periodic CSI, or may include a priority allocated to a report mode associated with each of the measurement target CSI processes of the periodic CSI.

Although the embodiments according to the present invention have been briefly described with reference to FIG. 6, the embodiment related to FIG. 6 may include at least a part of the aforementioned embodiment(s) alternatively or additionally.

Since the examples of the above-described suggested methods may be included as one of the implementation methods of the present invention, it will be apparent that the examples may be regarded as the suggested methods. Also, although the above-described suggested methods may be implemented independently, the suggested methods may be implemented in the form of combination (or incorporation) of some of the suggested methods. A rule may be defined such that information as to application of the suggested methods (or information on the rules of the suggested methods) may be notified from the base station to the terminal through a predefined signal (e.g., physical layer signal or higher layer signal).

Figure 7:
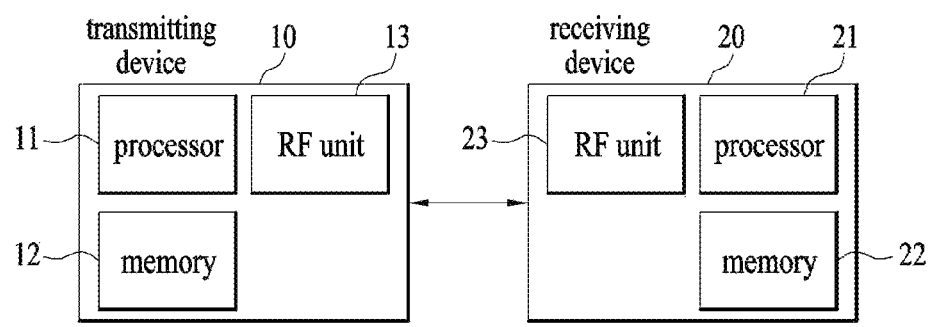
FIG. 7 is a block diagram illustrating an apparatus for implementing the embodiment(s) of the present invention.

FIG. 7 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

The invention claimed is:

1. A method for aperiodic channel state reporting in a wireless communication system, the method being performed by a terminal, the method comprising:
transmitting, to a base station, terminal capability information, which includes information on maximum calculation capability of aperiodic channel state information (CSI);
receiving an aperiodic CSI report request from the base station; and
calculating aperiodic CSI corresponding to the aperiodic CSI report request based on the maximum calculation capability of the aperiodic CSI and transmitting the calculated aperiodic CSI to the base station,
wherein the information on the maximum calculation capability of the aperiodic CSI includes the number N of maximum CSI processes that the terminal calculates simultaneously, where N is an integer equal to or greater than 1, and
wherein, when a transmission of periodic CSI is required in a subframe in which the aperiodic CSI is transmitted, CSI transmissions for measurement target CSI processes of periodic CSI, which are the same as those of the aperiodic CSI, are dropped, and wherein periodic CSIs selected based on a priority from among CSIs for measurement target CSI processes of periodic CSI, which are not the same as those of the aperiodic CSI, are transmitted in the subframe by being multiplexed with the aperiodic CSI, and other periodic CSIs which are not selected are dropped.

2. The method according to claim 1 further comprising updating aperiodic CSI for the N CSI processes when the aperiodic CSI report request indicates M CSI processes, where M exceeds N.

3. The method according to claim 1 further comprising: calculating and transmitting aperiodic CSI for CSI processes which are in an activated state or in which a valid reference resource exists when the aperiodic CSI report request indicates M CSI processes, where M exceeds N.

4. The method according to claim 3, wherein the valid reference resource includes a downlink subframe defined as a CSI reference resource.

5. The method according to claim 3, wherein the valid reference resource includes a downlink subframe which belongs to an RRP (reserved resource period) for an unlicensed band, a downlink subframe which belongs to an RRP and in which a reference signal is transmitted, or a downlink subframe in which a reference signal is transmitted.

6. The method according to claim 3 further comprising: calculating and transmitting aperiodic CSI for N CSI processes having higher priorities, each CSI process being allocated a priority, when the number of CSI processes which are in an activated state or in which the valid reference resource exists is greater than N.

7. The method according to claim 1, wherein a priority is allocated to each of the measurement target CSI processes of the periodic CSI.

8. The method according to claim 1, wherein a priority is allocated to a report mode associated with each of the measurement target CSI processes of the periodic CSI.

9. The method according to claim 1, wherein the number of maximum CSI processes is the number of total CSI processes configured for all cells configured for the terminal.

10. A terminal configured to report aperiodic channel status in a wireless communication system, the terminal comprising:
a transmitter and receiver; and
a processor, operatively coupled to the transmitter and receiver, wherein the processor is configured to:
control the transmitter to transmit, to a base station, terminal capability information, which includes information on maximum calculation capability of aperiodic channel state information (CSI), control the receiver to receive an aperiodic CSI report request from the base station, and calculate aperiodic CSI corresponding to the aperiodic CSI report request based on the maximum calculation capability of the aperiodic CSI and control the transmitter to transmit the calculated aperiodic CSI to the base station,
wherein the information on the maximum calculation capability of the aperiodic CSI includes the number N of maximum CSI processes that the terminal calculates simultaneously, where N is an integer equal to or greater than 1, and
wherein, when a transmission of periodic CSI is required in a subframe in which the aperiodic CSI is transmitted, CSI transmissions for measurement target CSI processes of periodic CSI, which are the same as those of the aperiodic CSI, are dropped, and wherein periodic CSIs selected based on a priority from among CSIs for measurement target CSI processes of periodic CSI, which are not the same as those of the aperiodic CSI, are transmitted in the subframe by being multiplexed with the aperiodic CSI, and other periodic CSIs which are not selected are dropped.

11. The terminal according to claim 10, wherein the processor updates aperiodic CSI for the N CSI processes when the aperiodic CSI report request indicates M CSI processes, where M exceeds N.

12. The terminal according to claim 10, wherein the processor is further configured to calculate and control the transmitter to transmit an aperiodic CSI for CSI processes which are in an activated state or in which a valid reference resource exists when the aperiodic CSI report request indicates M CSI processes where M exceeds N.

13. The terminal according to claim 12, wherein the valid reference resource includes a downlink subframe defined as a CSI reference resource.

14. The terminal according to claim 12, wherein the valid reference resource includes a downlink subframe which belongs to an RRP (reserved resource period) for an unlicensed band, a downlink subframe which belongs to an RRP and in which a reference signal is transmitted, or a downlink subframe in which a reference signal is transmitted.

15. The terminal according to claim 12, wherein the processor is further configured to calculate and control the transmitter to transmit aperiodic CSI for N CSI processes having higher priorities, each CSI process being allocated a priority, when the number of CSI processes which are in an activated state or in which the valid reference resource exists is greater than N.

16. The terminal according to claim 10, wherein a priority is allocated to each of the measurement target CSI processes of the periodic CSI.

17. The terminal according to claim 10, wherein a priority is allocated to a report mode associated with each of the measurement target CSI processes of the periodic CSI.

18. The terminal according to claim 10, wherein the number of maximum CSI processes is the number of total CSI processes configured for all cells configured for the terminal.

* * * * *